(12) United States Patent
Ohzeki

(10) Patent No.: US 7,297,179 B2
(45) Date of Patent: *Nov. 20, 2007

(54) METHOD OF PRODUCING METAL PARTICLES, AND METAL OXIDE OBTAINED FROM THE PARTICLES

(75) Inventor: Katsuhisa Ohzeki, Minami-ashigara (JP)

(73) Assignee: Fujifilm Corporation, Tokyo (JP)

(*) Notice: Subject to any disclaimer, the term of this patent is extended or adjusted under 35 U.S.C. 154(b) by 619 days.

This patent is subject to a terminal disclaimer.

(21) Appl. No.: 10/670,790

(22) Filed: Sep. 26, 2003

(65) Prior Publication Data

US 2004/0131538 A1 Jul. 8, 2004

(30) Foreign Application Priority Data

Sep. 30, 2002 (JP) .............................. 2002-287810
Sep. 30, 2002 (JP) .............................. 2002-287824

(51) Int. Cl.
*B22F 9/24* (2006.01)
(52) U.S. Cl. .............................. 75/351; 75/371; 264/11
(58) Field of Classification Search ................. 75/351, 75/371; 264/11
See application file for complete search history.

(56) References Cited

U.S. PATENT DOCUMENTS 4,289,732 A 9/1981 Bauer et al.
4,383,852 A * 5/1983 Yoshizawa .................... 75/363
5,104,786 A 4/1992 Chronis et al.
6,174,469 B1 * 1/2001 Ganan-Calvo ............... 264/12
6,942,715 B2 * 9/2005 Ito et al. ....................... 75/345

FOREIGN PATENT DOCUMENTS

| JP | 55-84527 | 6/1980 |
|----|----------|--------|
| JP | 4-139440 A | 5/1992 |
| JP | 8-334848 A | 12/1996 |
| JP | 11-38539 A | 2/1999 |
| JP | 2000-338620 A | 12/2000 |
| JP | 2001-290231 A | 10/2001 |

* cited by examiner

Primary Examiner—George Wyszomierski
(74) Attorney, Agent, or Firm—Sughrue Mion Pllc.

(57) ABSTRACT

A method of producing (1) metal particles or (2) metal fine-particles, which contains: jetting out two solutions of (1) a metal salt solution and a reducing agent solution, or (2) a metal ion-containing solution and a hydroxide ion-containing solution, from respective nozzles to a mixing chamber, to give a mixed reaction solution; and discharging the mixed reaction solution from a discharging port having a diameter smaller than a diameter of the mixing chamber, wherein one of the two solutions is made into straightly-going flow, which is jetted from a nozzle having a diameter smaller than the diameter of the mixing chamber to the mixing chamber, and the other solution is jetted out, as flow substantially orthogonal to the straightly-going flow, to a position before a position where eddy viscosity generated by the straightly-going flow would be maximum.

14 Claims, 7 Drawing Sheets

METHOD OF PRODUCING METAL PARTICLES, AND METAL OXIDE OBTAINED FROM THE PARTICLES

FIELD OF THE INVENTION

The present invention relates to a method of producing metal particles; in particular, a method of producing metal fine-particles having nanometer particle sizes. Further, the present invention relates to a method of producing a dispersion containing the fine particles.

Further, the present invention relates to a method of producing metal hydroxide particles; in particular, a method of producing metal hydroxide fine-particles having nanometer particle sizes. Further, the present invention relates to a method of producing a dispersion containing the fine particles. Further, the present invention relates to a metal oxide obtained by oxidizing the metal, e.g. in the form of metal hydroxide.

BACKGROUND OF THE INVENTION

Metal particles can be synthesized, for example, by a gas phase method, in which metal vapor evaporated at high temperature is supplied into a gas phase to cool the vapor rapidly by collision with gas molecules, thereby forming fine particles; a solution method, which may be referred to as a liquid phase method hereinafter, in which a reducing agent is added to a solution in which metal ions are dissolved to reduce the metal ions, or some other method.

Metal hydroxide fine particles can be synthesized, for example, by the above gas phase method; or a liquid phase method, such as a solution method of controlling pH or anions of an aqueous solution in which metal ions are dissolved, to take out a metal hydroxide, and subsequently drying or firing the hydroxide, as well as a sol-gel method, a reversed micelle method, or a hot soap method.

Among these methods, the liquid phase method has an advantage that the particles can be relatively inexpensively synthesized in great volume. The liquid phase method is usually performed by adding a metal cation solution, and a reducing agent solution or a solution that contains hydroxide ions, to a reaction vessel having a stirrer. By initial addition thereof, nuclei are formed, and by subsequent addition, crystal growth is caused. For example, various methods used to form silver halide grains are known (see, for example, JP-A-7-219092 ("JP-A" means unexamined published Japanese patent application), JP-A-8-171156, JP-A-4-283741, JP-B-8-22739 ("JP-B" means examined Japanese patent publication), and U.S. Pat. No. 3,782,954). However, when any of these methods is used in nuclei formation, any stirring that can be used makes the liquid circulate in the reaction vessel, and therefore the nucleus formation is caused in parallel to nucleus growth, and as a result, it is difficult to form monodispersive nuclei.

To perform mixing of the added liquid without mechanical stirring, methods wherein no circulation of the added liquid is performed are also disclosed (see, for example, JP-A-4-139440 and JP-T-6-507255 ("JP-T" means searched and published International patent application)). However, in these methods, the power of the mixing is insufficient, since intense stirring is not performed. Methods of mixing the two liquids in a pipe are also disclosed (see, for example, U.S. Pat. No. 5,104,786, and JP-A-11-38539). Although no circulation of the added liquid is generated in this case, the added liquid is so-called plug flow, which flows in a constant direction; therefore, it is unavoidable that the mixing relies on the generation of turbulence accompanying high flow velocity. Thus, to generate sufficient turbulence in the plug flow, it is necessary to maintain a very high velocity flow, and carrying out this involves difficulty.

To keep sufficient mixing power without any mechanical stirring, there are known methods to make the added liquid into a linear jet flow, and perform the mixing by kinetic energy thereof. For example, a method of using kinetic energy of such a jet flow to produce a silver halide photographic emulsion is also disclosed (see, for example, JP-A-8-334848). However, the method disclosed in JP-A-8-334848 is a production method based on a single jet method; mechanical stirring is together used, since the used kinetic energy is insufficient to perform mixing in the entire reaction vessel.

There are also known methods to make at least one of two-type aqueous solutions into a linear jet flow having a high flow velocity, and mix the two-type solutions in a short period of time, to produce silver halide grains continuously (see, for example, JP-A-2000-338620 and JP-A2001-290231). However, even if high flow velocity is used in these methods, the caused mixing is insufficient for mixing microscopically. Thus, further improvement has been desired.

In the dispersion obtained by the reaction, a salt(s) or a decomposition product(s), which are by-products, are dissolved together with metal hydroxide fine particles. Thus, it is usually necessary to remove these by-products. To remove the salts or the decomposition products, for example, ultrafiltration, electrodialysis, or centrifugal separation is used. However, when the dispersion containing fine particles of nanometer size is treated, the former two methods cause the filtration membrane or the dialysis membrane to be easily clogged, and as such the methods are not practical. The latter method is inefficient, since batch treatment must be conducted.

SUMMARY OF THE INVENTION

The present invention resides in a method of producing metal particles, which comprises:

jetting out a metal salt solution and a reducing agent solution from respective nozzles to a mixing chamber, to give a mixed reaction solution thereof; and discharging the mixed reaction solution from a discharging port having a diameter smaller than a diameter of the mixing chamber, wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

Further, the present invention resides in a method of producing metal particles, which comprises:

jetting out a metal salt solution and a reducing agent solution from respective nozzles to a mixing chamber, to give a mixed reaction solution thereof; and discharging the mixed reaction solution from a discharging port having a diameter smaller than a diameter of the mixing chamber, wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity Vz of the straightly-going flow is represented by the following formula (1), in a direction along which the maximum velocity of the straightly-going flow is exhibited when the straightly-going flow is jetted into the mixing camber:

$(1/10)Vz0 < Vz < Vz0$                     Formula (1)

wherein Vz0 represents a velocity of the straightly-going flow at an outlet of the nozzle in the direction along which the maximum velocity of the straightly-going flow is exhibited when the straightly-going flow is jetted into the mixing camber.

Further, the present invention resides in a method of producing metal fine-particles, which comprises:

jetting out a metal ion-containing solution and a hydroxide ion-containing solution from respective nozzles to a mixing chamber, to give a mixed reaction solution thereof; and discharging the mixed reaction solution from a discharging port having a diameter smaller than a diameter of the mixing chamber, wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

Further, the present invention resides in a method of producing metal fine-particles, which comprises:

jetting out a metal ion-containing solution and a hydroxide ion-containing solution from respective nozzles to a mixing chamber, to give a mixed reaction solution thereof; and discharging the mixed reaction solution from a discharging port having a diameter smaller than a diameter of the mixing chamber, wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity Vz of the straightly-going flow is represented by the following formula (1), in a direction along which the maximum velocity of the straightly-going flow is exhibited when the straightly-going flow is jetted into the mixing camber:

$(1/10)Vz0 < Vz < Vz0$                     Formula (1)

wherein Vz0 represents a velocity of the straightly-going flow at an outlet of the nozzle in the direction along which the maximum velocity of the straightly-going flow is exhibited when the straightly-going flow is jetted into the mixing camber.

Further, the present invention resides in a method of producing a dispersion containing metal fine-particles, which comprises:

providing a multistage ultrafiltration apparatus, in addition to a mixer and/or a reaction vessel that contains a fine-particle dispersion in which the metal fine-particles produced by any one of the above methods are dispersed; and continuously removing a salt dissolved in the fine-particle dispersion.

Further, the present invention resides in a metal oxide obtained by oxidizing the metal fine-particles produced by any one of the above methods.

Other and further features and advantages of the invention will appear more fully from the following description, taken in connection with the accompanying drawings.

DETAILED DESCRIPTION OF THE INVENTION

Figure 1:
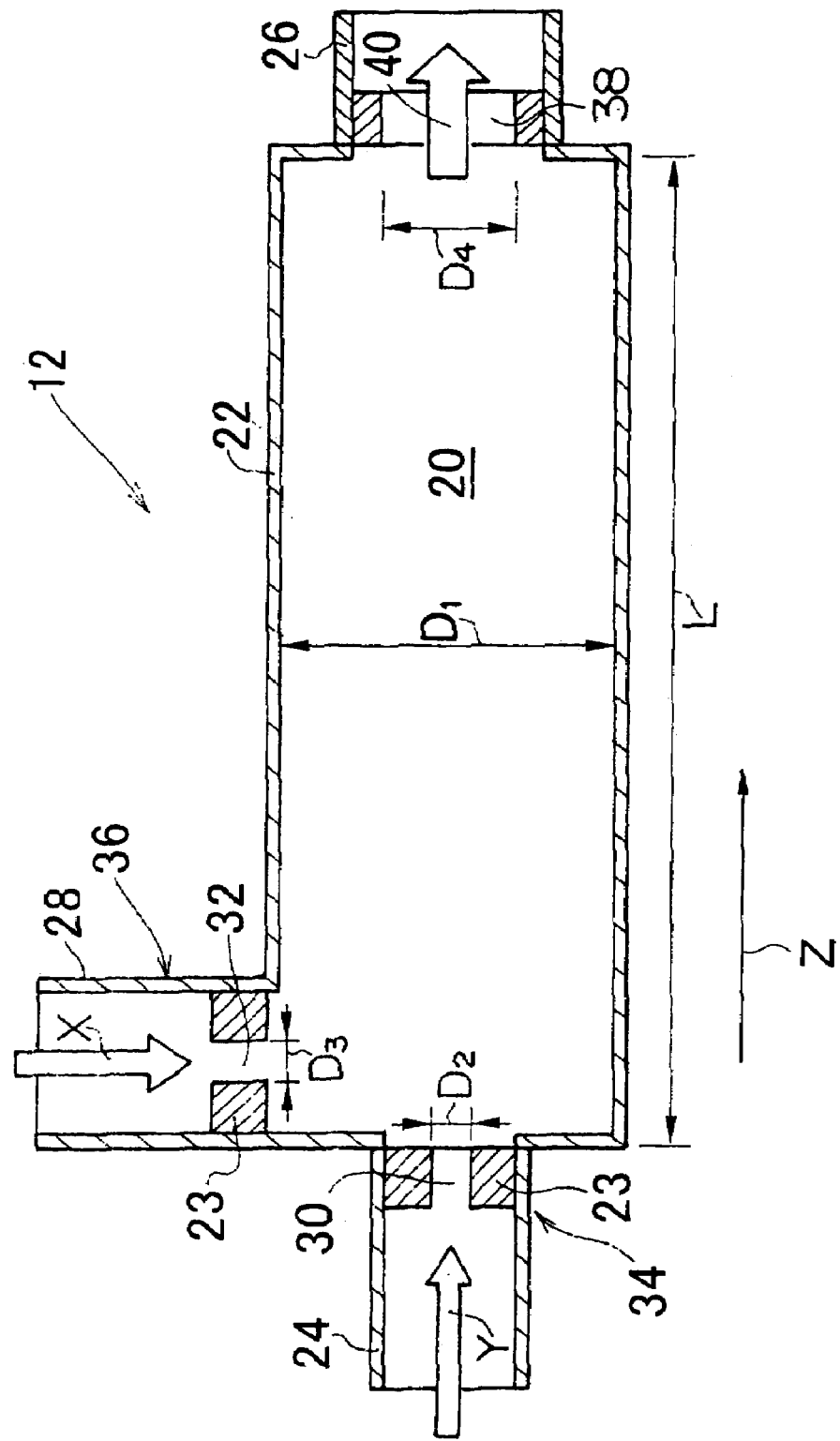
FIG. 1 is a schematic diagram of an example of a static mixing apparatus that can be used in the method of the present invention, for producing metal particles or metal hydroxide fine-particles.

According to the present invention, there are provided the following means:

(1) A method of producing metal particles, comprising:

jetting out a metal salt solution and a reducing agent solution from respective nozzles to a mixing chamber, to cause the solutions to be mixed and react with each other to give a mixed reaction solution thereof; and discharging the mixed reaction solution from a discharging port having a diameter smaller than a diameter of the mixing chamber, wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

(2) A method of producing metal particles, comprising:

jetting out a metal salt solution and a reducing agent solution from respective nozzles to a mixing chamber, to cause the solutions to be mixed and react with each other to give a mixed reaction solution thereof; and discharging the mixed reaction solution from a discharging port having a diameter smaller than a diameter of the mixing chamber, wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity Vz of the straightly-going flow is represented by the following formula (1), in a direction along which the maximum velocity of the straightly-going flow is exhibited when the straightly-going flow is jetted into the mixing camber:

$$(1/10)Vz0 < Vz < Vz0 \quad \text{Formula (1)}$$

wherein Vz0 represents a velocity of the straightly-going flow at an outlet of the nozzle in the direction along which the maximum velocity of the straightly-going flow is exhibited when the straightly-going flow is jetted into the mixing camber.

(3) The method according to the above item (1) or (2), wherein the straightly-going flow is in a thread line form.

(4) The method according to any one of the above items (1) to (3), wherein a flow velocity of the orthogonal flow when being jetted out is equivalent to or less than a flow velocity of the straightly-going flow when being jetted out.

(Hereinafter, a first embodiment of the present invention means to include the methods of producing metal particles described in the items (1) to (4) above.)

(5) A method of producing metal fine-particles (e.g. metal hydroxide fine-particles), comprising:

jetting out a metal ion-containing solution and a hydroxide ion-containing solution from respective nozzles to a mixing chamber, to cause the solutions to be mixed and react with each other to give a mixed reaction solution thereof; and discharging the mixed reaction solution from a discharging port having a diameter smaller than a diameter of the mixing chamber, wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

(6) A method of producing metal fine-particles (e.g. metal hydroxide fine-particles), comprising:

jetting out a metal ion-containing solution and a hydroxide ion-containing solution from respective nozzles to a mixing chamber, to cause the solutions to be mixed and react with each other to give a mixed reaction solution thereof; and discharging the mixed reaction solution from a discharging port having a diameter smaller than a diameter of the mixing chamber, wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity Vz of the straightly-going flow is represented by the following formula (1), in a direction along which the maximum velocity of the straightly-going flow is exhibited when the straightly-going flow is jetted into the mixing camber:

$$(1/10)Vz0 < Vz < Vz0 \quad \text{Formula (1)}$$

wherein Vz0 represents a velocity of the straightly-going flow at an outlet of the nozzle in the direction along which the maximum velocity of the straightly-going flow is exhibited when the straightly-going flow is jetted into the mixing camber.

(7) The method according to the above item (5) or (6), wherein the straightly-going flow is in a thread line form.

(8) The method according to any one of the above items (5) to (7), wherein a flow velocity of the orthogonal flow when being jetted out is equivalent to or less than a flow velocity of the straightly-going flow when being jetted out.

(9) A method of producing a dispersion containing metal fine-particles, comprising:

providing a multistage ultrafiltration apparatus, in addition to a mixer and/or a reaction vessel that contains a fine-particle dispersion in which the metal fine-particles produced by the production method according to any one of the above items (5) to (8) are dispersed; and continuously removing a salt dissolved in the fine-particle dispersion.

(10) A metal oxide, which is obtained by oxidizing the metal fine-particleas produced by the production method according to any one of the above items (5) to (8).

(Hereinafter, a second embodiment of the present invention means to include the methods of producing metal fine-particles described in the items (5) to (8) above, the method of producing a dispersion containing metal fine-particles described in the item (9) above, and the metal oxide described in the item (10) above.)

Herein, the present invention means to include both of the above first and second embodiments, unless otherwise specified.

The present invention will be described in detail hereinafter.

The flow of fluid is classified into largely different two flow patterns. One thereof is laminar flow, and it is flow, in which fluid particles in each portion flow systematically, without putting the front and rear of the particles along the flow direction into disorder, nor replacing the positions of the particles adjacent along the direction perpendicular to the flow direction mutually. The other is turbulence, and it is flow, in which fluid particles in each portion move irregularly in the front and rear direction and/or in the right and left direction. The time when flow is transited from laminar flow to turbulence is a time when the Reynolds' number thereof reaches a given value.

In turbulence, any material is mixed due to two factors, that is, so-called flow, which will be referred to as "average flow" hereinafter, and eddy that flows in a direction different from the average flow, which will be referred to "eddy flow (vortex flow)" hereinafter. In order to obtain a high stirring efficiency in microscopic regions, it is necessary to perform mixing on the basis of eddy flow. In the case that a conventional method as disclosed in, for example, U.S. Pat. No. 5,104,786 mentioned at "BACKGROUND OF THE INVENTION" of the specification, is used to generate eddy flow, it cannot be said that sufficient mixing is attained even if an apparatus having a Reynolds' number of several tens of thousands is used. In this connection, the inventor has found that the flow velocity of flow is reduced in a short period of time, thereby the kinetic energy of the fluid can be converted from that in average flow to eddy flow, and that the efficiency for stirring and mixing the flow can be made remarkably high.

In the case that the motion of fluid is based on turbulence, the apparent viscosity value thereof becomes very high. This apparent viscosity is "eddy viscosity". A change from average flow to eddy flow can be evaluated as the eddy viscosity. Thus, in the present invention, plural solutions in which reaction should be caused are introduced into a site wherein large eddy viscosity is generated.

In the case that eddy viscosity is generated in jetted flow, the amount of eddy flow generated when the velocity of the jet flow is reduced can be made larger, which is more profitable for mixing, as the velocity of the jetted flow is larger. On the other hand, in order to generate a larger jetted flow velocity in any conventional method, it is necessary to generate high pressure. Thus, problems such that a large burden is imposed on the production are caused. In the present invention, however, a high mixing efficiency can be obtained even if the velocity of flow jetted into a velocity-reducing region of the jetted flow, that is, a mixing chamber is relatively small. As a result, burden imposed on the production can be largely reduced.

The size of the particles in the present invention, preferably the size of the metal particles produced by the production method of the first embodiment of the present invention, is not particularly limited. The particles preferably have particle sizes of 1 μm or less, and are more preferably (metal) fine-particles having particle sizes of 100 nm or less, which may also be called nanoparticles.

A preferable mode of the first embodiment of the present invention is a method of forming metal fine-particles, which comprises: jetting out a metal salt solution and a reducing agent solution from respective nozzles to a mixing chamber having a diameter larger than the diameter of the nozzle, to cause the solutions to be mixed and react with each other; and discharging the mixed reaction solution from a discharging port having a diameter smaller than the diameter of the mixing chamber, wherein one solution of the metal salt solution and the reducing agent solution is made into turbulent straightly-going flow, the straightly-going flow is jetted to the mixing chamber, and the other solution is jetted out, in the form of orthogonal flow which is substantially orthogonal to the straightly-going flow, to a position before the position where eddy viscosity generated by jetting the straightly-going flow from the small-diameter nozzle into the larger-diameter mixing chamber would be maximum, thereby the one solution and the other solution are caused to be mixed and react with each other instantaneously.

Another preferable mode of the first embodiment of the present invention is a method of forming metal fine-particles, comprises: jetting out a metal salt solution and a reducing agent solution from respective nozzles to a mixing chamber having a diameter larger than the diameter of the nozzle, to cause the solutions to be mixed and react with each other; and discharging the mixed reaction solution from a discharging port having a diameter smaller than the diameter of the mixing chamber, wherein one solution of the metal salt solution and the reducing agent solution is made into turbulent straightly-going flow, the straightly-going flow is jetted to the mixing chamber, and the other solution is jetted out, in the form of orthogonal flow which is substantially orthogonal to the straightly-going flow, to a position before the position where the velocity of the straightly-going flow would be reduced to 1/10 or less of the maximum flow velocity thereof, thereby the one solution and the other solution are caused to be mixed and react with each other instantaneously.

Preferable modes of the second embodiment of the present invention are the same as the above-mentioned preferable modes of the first embodiment of the present invention, except that the metal salt solution and the reducing agent solution are replaced with a solution that contains metal ions and a solution that contains hydroxide ions, respectively, to form metal hydroxide fine-particles.

The following will describe a preferred apparatus for carrying out the production method of the first embodiment of the present invention. In a metal fine-particle-forming apparatus for forming metal fine-particles by mixing a metal salt solution and a reducing agent solution in a static mixing apparatus to react with each other, the static mixing apparatus comprises: a mixer, which is provided with a cylindrical mixing chamber for mixing the metal salt solution and the reducing agent solution to react with each other; a first nozzle for jetting one of the metal salt solution and the reducing agent solution, in the form of straightly-going flow of jet flow, into the mixing chamber; a second nozzle for jetting the other solution of the metal salt solution and the reducing agent solution, in the form of orthogonal flow which is substantially orthogonal to the straightly-going flow, into the mixing chamber, the second nozzle being positioned in such a manner that the flow from the second nozzle is jetted out to a position before the position where eddy viscosity generated, in the mixing chamber, by the straightly-going flow jetted-out from the first nozzle would be maximum; and a discharging port for discharging, from the mixing chamber, a mixed reaction solution resulted from mixing and reaction in the mixing chamber, wherein the cylinder diameter of the mixing chamber is larger than the diameters of the first nozzle, the second nozzle and the discharging port.

Another preferable mode is a metal fine-particle-forming apparatus for forming metal fine-particles by mixing a metal salt solution and a reducing agent solution in a static mixing apparatus to react with each other, wherein the static mixing apparatus comprises: a mixer, which is provided with a cylindrical mixing chamber for mixing the metal salt solution and the reducing agent solution to react with each other; a first nozzle for jetting one solution of the metal salt solution and the reducing agent solution, in the form of turbulent straightly-going flow, into the mixing chamber; a second nozzle for jetting the other solution of the metal salt solution and the reducing agent solution, in the form of orthogonal flow which is substantially orthogonal to the straightly-going flow, into the mixing chamber, the second nozzle being positioned in such a manner that the flow from the second nozzle is jetted out to a position before the position where the velocity of the straightly-going flow jetted-out from the first nozzle would be reduced to 1/10 or less of the maximum flow velocity thereof when the straightly-going flow is jetted out; and a discharging port for discharging, from the mixing chamber, a mixed reaction solution resulted from mixing and reaction in the mixing chamber, wherein the cylinder diameter of the mixing chamber is larger than the diameters of the first nozzle, the second nozzle and the discharging port.

Preferable apparatuses for carrying out the production method of the second embodiment of the present invention are the same as the above apparatuses that can be preferably used in the first embodiment of the present invention, except that the metal salt solution and the reducing agent solution are replaced with a solution which contains metal ions and a solution which contains hydroxide ions, respectively, to form metal hydroxide fine-particles.

In the present invention, the straightly-going flow is jetted out in the form of jet flow, and then introduced into the mixing chamber.

In the present invention, the wording "the other solution is jetted out (into the mixing chamber) in the form of orthogonal flow which is substantially orthogonal to the straightly-going flow" means that the orthogonal flow is allowed not to be completely orthogonal to the straightly-going flow and has, as the main component, a velocity vector component in the orthogonal direction to the straightly-going flow. The term "having, as the main component, a velocity vector component in the orthogonal direction to the straightly-going flow" means that the component orthogonal (at 90°) to the Z direction, which is the direction of the straightly-going flow, is 70% or more of the average value of velocity vector of the orthogonal flow when jetted into the mixing chamber.

The wording "static mixing apparatus" means any mixing apparatus which has no stirring means, such as a stirrer, in the mixing site thereof.

In the present invention, the wording "particles are mono-dispersive" means that the variation coefficient of the particle sizes (distribution) is preferably less than 20%, more preferably less than 15%.

The present invention does not use the following technique: as performed in conventional static mixers, high velocity turbulence of a solution which contains metal ions and high velocity turbulence of a solution which contains hydroxide ions are caused to collide with each other at an intersection point of a very thin pipe (tube), such as a T-shaped tube or a Y-shaped tube, so that the solutions are instantaneously mixed and caused to react with each other in the collision site. For example, paying attention to eddy viscosity known as a miscibility-evaluating factor in eddy flow sites, the first embodiment of the present invention is made to add straightly-going flow, e.g., in a thread line form, of a reducing agent solution (or a metal salt solution) and orthogonal flow of a metal salt solution. (or a reducing agent solution) to a mixing chamber inside a static mixing apparatus, and to use eddy viscosity generated by being carried by the straightly-going flow, thereby causing the two solutions to be mixed and react with each other instantaneously. In the second embodiment of the present invention, two solutions are instantaneously mixed and caused to react with each other in the same manner as in the first embodiment of the present invention, except for using, instead of the metal salt solution and the reducing agent solution, a solution which contains metal ions and a solution which contains hydroxide ions, respectively.

That is, a static mixing apparatus that can be used in the present invention is a mixer, wherein a first nozzle and a second nozzle are provided to the mixer in which a cylindrical mixing clamber is formed, the diameters of each of the nozzles being smaller than the diameter (cylinder diameter) of the mixing chamber, thereby eddy viscosity can be generated by jetting out the solutions from the small-diameter nozzles to the larger-diameter mixing chamber; and further the diameter of a discharging port is narrowed to apply pressure to the mixing chamber, thereby a gas-liquid interface is not easily formed in the mixing chamber by cavitation.

Further, the present inventor found the fact that when the eddy viscosity is generated by the straightly-going flow jetted out one solution of the metal salt solution and the reducing agent solution from the first nozzle in the first embodiment, or one of the metal ion-containing solution and the hydroxide ion-containing solution from the first nozzle in the second embodiment, the eddy viscosity becomes maximum at a position slightly apart in distance jetted from the first nozzle, and at this position of the maximum eddy viscosity the efficiency for mixing the two solutions becomes maximum. In the present invention, the positional relationship between the first nozzle and the second nozzle is defined in such a manner that the orthogonal flow, which is the other solution of the two solutions, is jetted into the mixing chamber at a position before the position where the eddy viscosity becomes maximum. The position where the eddy viscosity becomes maximum can be determined, by using a numerical analysis software which has already been commercially available as a fluidity analysis software in Japan (for example, R-Flow (trade name), manufactured by R-Flow Co.), to perform a simulation beforehand, and to grasp a region where eddy viscosity appears and the center point thereof. The position where the orthogonal flow from the second nozzle is to be added can be determined to be on the side nearer the jetting nozzle of the straightly-going flow from this central point.

The position where the eddy viscosity becomes maximum in the mixing chamber corresponds substantially to a position where the maximum velocity of the straightly-going flow from the first nozzle is reduced to $\frac{1}{10}$ thereof. Therefore, the second nozzle may be positioned in such a manner that the orthogonal flow is jetted out before the velocity of the straightly-going flow is reduced to $\frac{1}{10}$ or less of the maximum velocity. As a result, the other solution is jetted out at a position before the position where the velocity of the straightly-going flow, as the one solution, is reduced to $\frac{1}{10}$ or less, thereby the two solutions can be mixed.

The wording "the other solution is jetted out at a position before the position where the velocity the straightly-going flow is reduced to $\frac{1}{10}$ or less, thereby the two solutions are mixed", referred to in the present invention, means that in the direction along the maximum velocity of the straightly-going flow is exhibited when the straightly-going flow is jetted out (hereinafter, referred to "Z direction" in some cases), a jetting port for the other solution is located at a position within the range where the velocity Vz of the straightly-going flow is represented by the following formula (1), and the other solution is jetted out in the form of orthogonal flow orthogonal substantially to the straightly-going flow:

$$(\frac{1}{10})Vz0 < Vz < Vz0 \qquad \text{Formula (1)}$$

wherein Vz0 represents the velocity of the straightly-going flow at the outlet of the nozzle in the direction along which the maximum velocity of the straightly-going flow is exhibited when the straightly-going flow is jetted into the mixing camber.

The jetting port for the other solution is located preferably at a position within the range where the velocity Vz of the straightly-going flow is represented by: $(\frac{1}{4})Vz0 < Vz < Vz0$, more preferably at a position within the range where the velocity Vz is represented by: $(\frac{1}{2})Vz0 < Vz < Vz0$.

The Vz, which is a position which should be determined, can be calculated, for example, by numerical fluid analysis using finite differential method.

The wording "mixing chamber" means a region for reducing the velocity of the straightly-going flow, and may be called "velocity-reducing region".

In order to use eddy viscosity to mix the orthogonal flow and the straightly-going flow efficiently, it is preferable to make the jetted flow velocity of the orthogonal flow when being jetted out equivalent to or less than, more preferably 1/10 or less of the jetted flow velocity of the straightly-going flow when being jetted out, thereby the orthogonal flow is involved in following wake that follows the straightly-going flow having a high velocity.

As described above, according to the present invention, since it is possible to realize a remarkably preferable mixing state in the static mixing apparatus, metal particles and metal hydroxide fine-particles, each of which have small particle sizes and are excellent in mono-dispersibility, can be formed.

Referring to the attached drawings, the following will describe preferred embodiments of the method of producing metal particles or metal hydroxide fine-particles according to the present invention and an apparatus that can be used in the method.

FIG. 1 is a schematic diagram illustrating one example of the structure of a static mixing apparatus 12 that can be used in the present invention. As illustrated in FIG. 1, in the static mixing apparatus 12, to an opening at one end side of a mixer 22, in which a cylindrical mixing chamber 20 is formed in order to mix a solution X (hereinafter, "solution X" means a metal salt solution in the first embodiment, and a solution which contains metal ions in the second embodiment) and a solution Y (hereinafter, "solution Y" means a reducing agent solution in the first embodiment, and a solution which contains hydroxide ions in the second embodiment) to react with each other, is connected a first pipe 24 for introducing the solution Y into the mixing chamber 20, and further a discharge pipe 26 for discharging a mixed reaction solution 40 obtained by the mixing and reaction in the mixing chamber 20 is connected to an opening at the other side of the mixer 22. A second pipe 28 for introducing the solution X into the mixing chamber 20 is connected to the side face of the mixer 22 in the vicinity of the outlet of the first pipe 24. In the present embodiment, the solution Y is introduced from the first pipe 24 and the solution X is introduced from the second pipe 28, but the two solutions may be made reverse. The position where the discharge pipe 26 is connected may be at a portion in the side face of the mixer 22 if the portion is near the other end of the mixer 22.

Inside the tips of the first pipe 24 and the second pipe 28, a first orifice 30 and a second orifice 32 are formed, respectively. In this way, a first nozzle 34 and a second nozzle 36, each of which is for jetting out turbulent liquid, are provided to the first pipe 24 and the second pipe 28, respectively. Symbol L represents the length of the mixing chamber 20; $D_1$, the diameter of the mixing chamber 20; $D_2$, the diameter (orifice diameter) of the first nozzle 34; $D_3$, the diameter (orifice diameter) of the second nozzle 36; $D_4$, the diameter of the discharge pipe 26; and Z, the direction along which the maximum velocity of the solution Y jetted out from the first nozzle 34 is exhibited.

The velocity of the solution jetted out from the first nozzle 34 is preferably from 10 m/sec to 360 m/sec, and particularly preferably from 10 m/sec to 100 m/sec.

As a method for digging the first and second orifices 30 and 32 in block-form orifice materials 23, there can be preferably used known micro-cutting, micro-grinding, blasting, micro electric discharge machining, LIGA processing, laser machining, SPM machining, or some other processing, each of which is known as a processing for accurately opening a nozzle (hole) for jetting having an opening diameter of about 100 μm in the orifice materials 23 made of metal, ceramic, glass or the like.

The orifice materials 23 are preferably made of a substance which has good workability and is as hard as diamond. Preferred examples of the substance besides diamond include various metals or alloys subjected to hardening treatment such as quenching, nitrogen hardening, or sintering. Ceramics can also be preferably used since they have high hardness and are superior in workability to diamond. In the present embodiment, the jetting structure of the first and second nozzles 34 and 36 are the orifice structure as an example, but may be any other structure that has a function of jetting turbulent liquid.

Non-illustrated pressurizing means are fitted to the first and second pipes 24 and 28. The solution Y and the solution X are supplied into the first and second nozzles 34 and 36 under pressure. As the pressurizing means for applying high pressure to liquid, various means are known. Any one thereof may be used. Preferably, a reciprocating pump such as a plunger pump or a booster pump is used since the pump is relatively available and inexpensive. Out of rotary pumps, which make it impossible to generate higher pressure than the reciprocating pump, high-pressure generating-type rotary pumps may be used.

The solution Y is jetted out, in the form of turbulent straightly-going flow A, from the first nozzle 34 to the mixing chamber 20, and the solution X is jetted out, in the form of orthogonal flow B which is substantially orthogonal to the straightly-going flow A, from the second nozzle 36 to the mixing chamber 20, so as to mix the two solutions to react with each other. Thus, the mixed reaction solution 40 which contains metal fine-particles or metal hydroxide fine-particles is produced. In this case, the orthogonal flow B is allowed not to be completely orthogonal at an angle of 90° to the straightly-going flow A, and it at least has, as the main component, a velocity vector component in the orthogonal direction. In FIG. 1, the second nozzle 36 for jetting out the orthogonal flow B is arranged above the mixer 22, but may be arranged below the mixer 22 or on a side thereof. In short, it is sufficient for the present embodiment that the orthogonal flow B can be jetted out so as to be substantially orthogonal to the straightly-going flow A.

Figure 2:
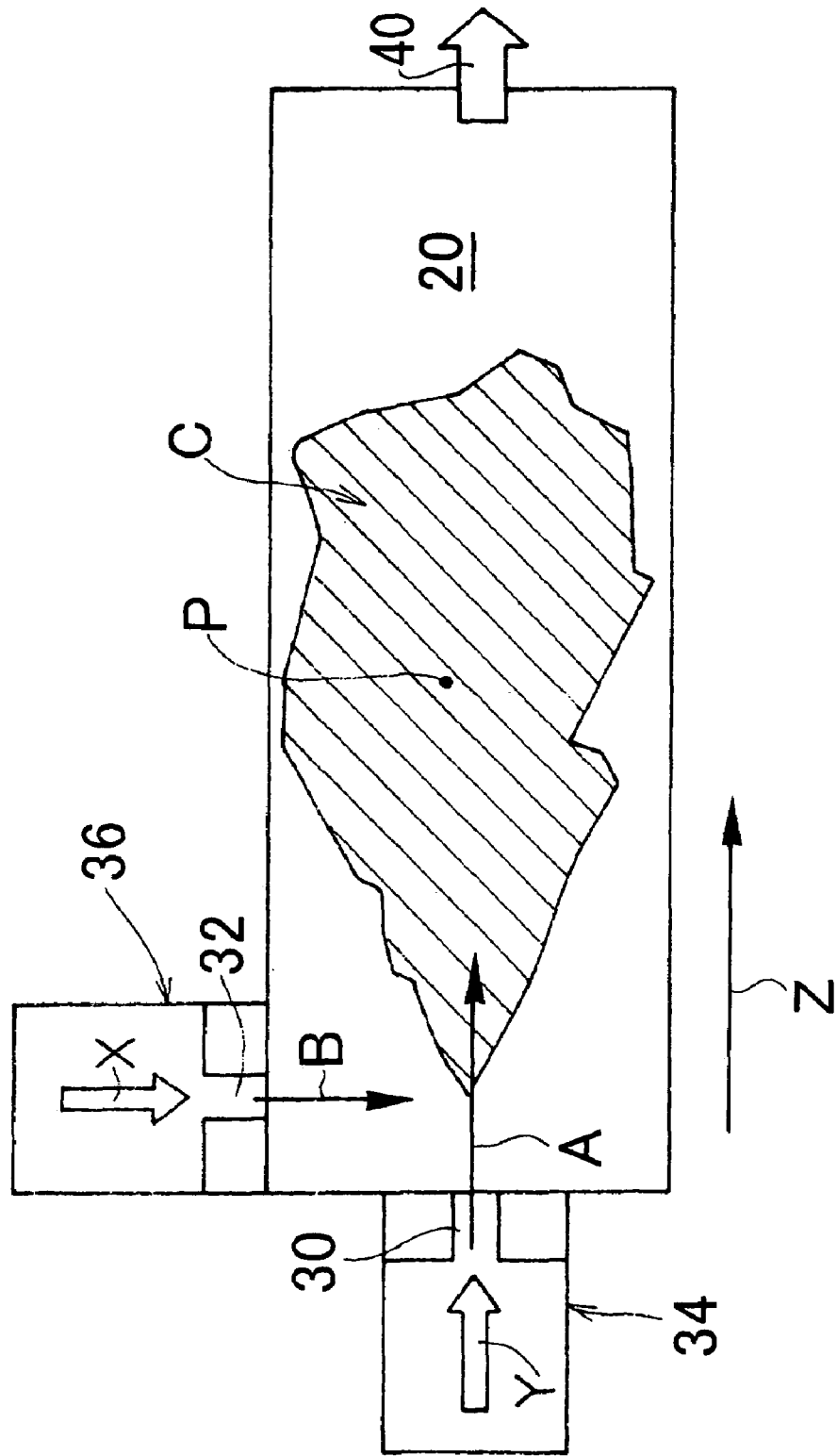
FIG. 2 is a schematic view explaining eddy viscosity formed in a mixing chamber of the static mixing apparatus.
Figure 3:
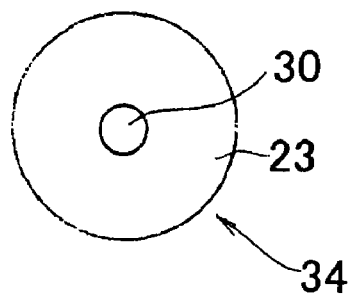
FIGS. 3(a), 3(b) and 3(c) are views explaining the shape of an orifice for forming jetted-out flow in a tread line form.
Figure 3:
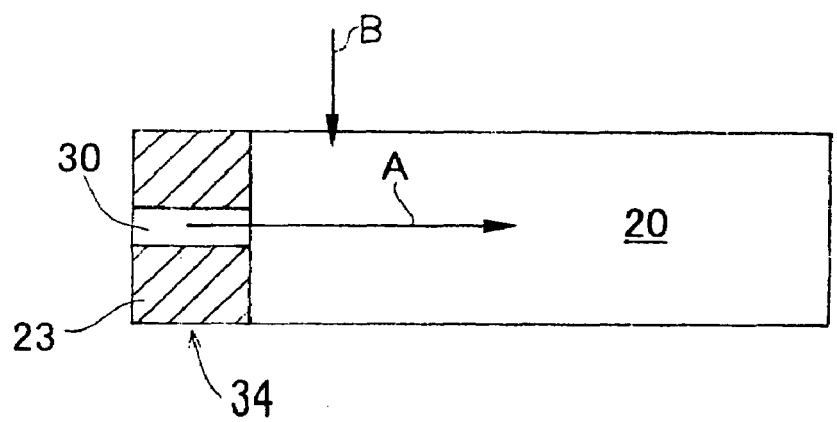
Figure 3:
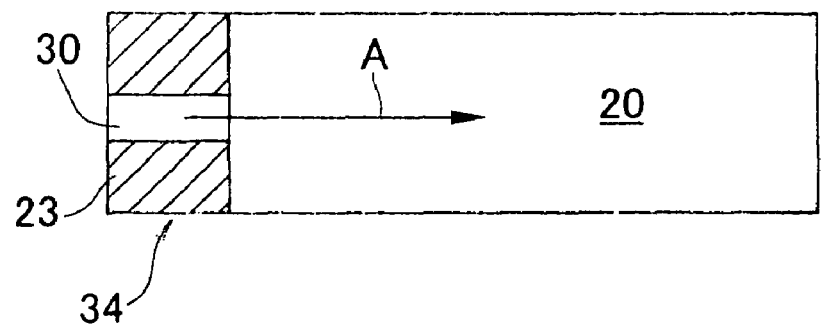
Figure 4:
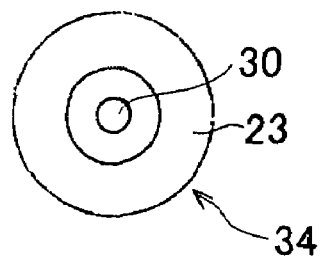
FIGS. 4(a), 4(b) and 4(c) are views explaining the shape of an orifice for forming jetted-out flow in a conical form.
Figure 4:
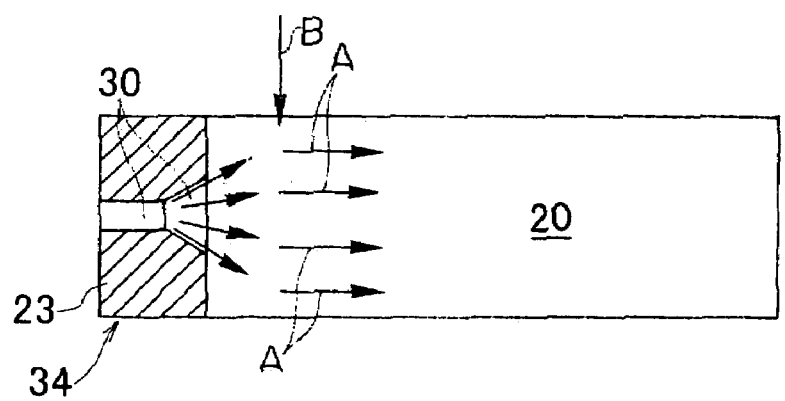
Figure 4:
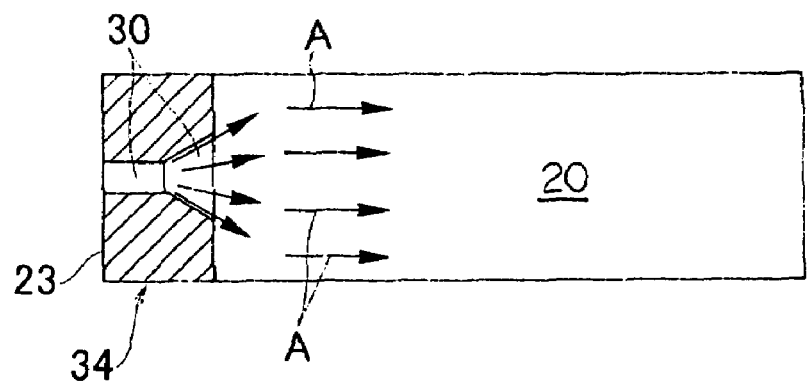
Figure 5:
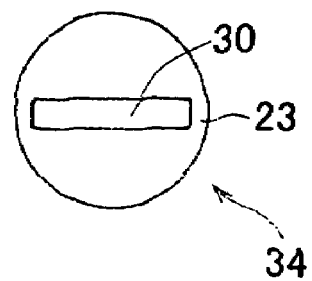
FIGS. 5(a), 5(b) and 5(c) are views explaining the shape of an orifice for forming jetted-out flow in a thin-film and slit form.
Figure 5:
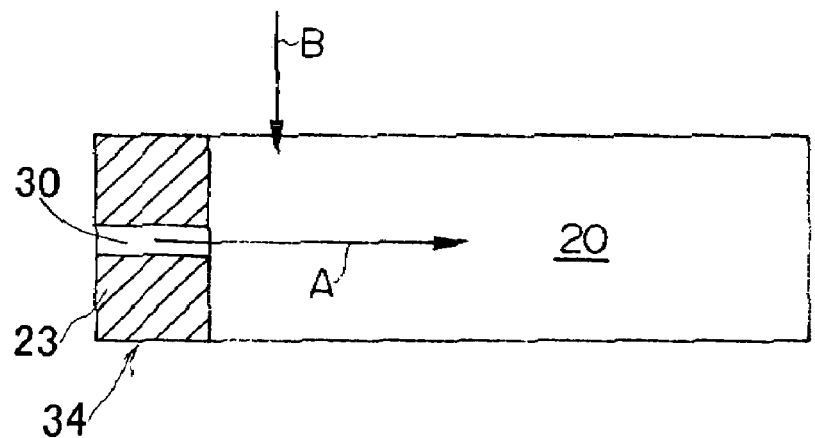
Figure 5:
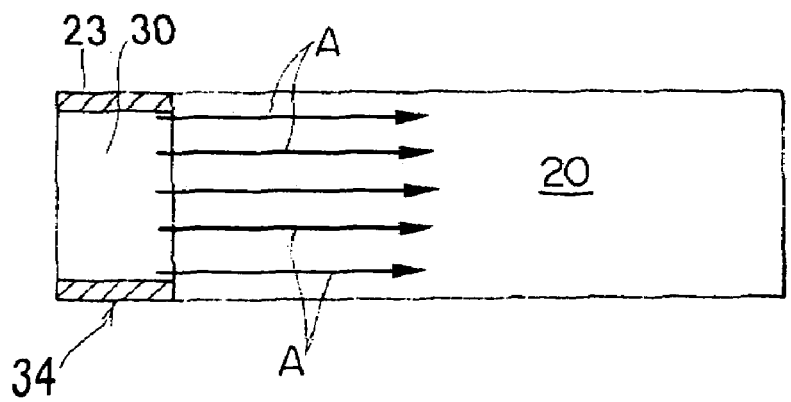
Figure 6:
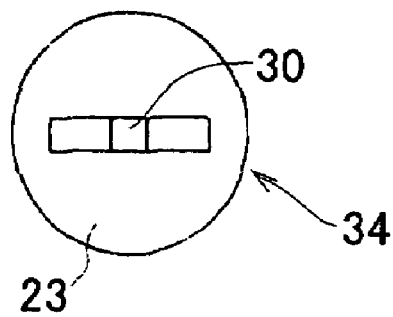
FIGS. 6(a), 6(b) and 6(c) are views explaining the shape of an orifice for forming jetted-out flow in a thin-film and fan form.
Figure 6:
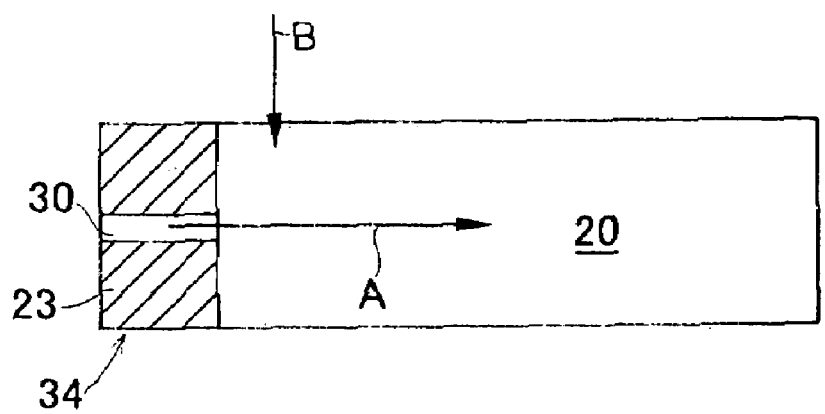
Figure 6:
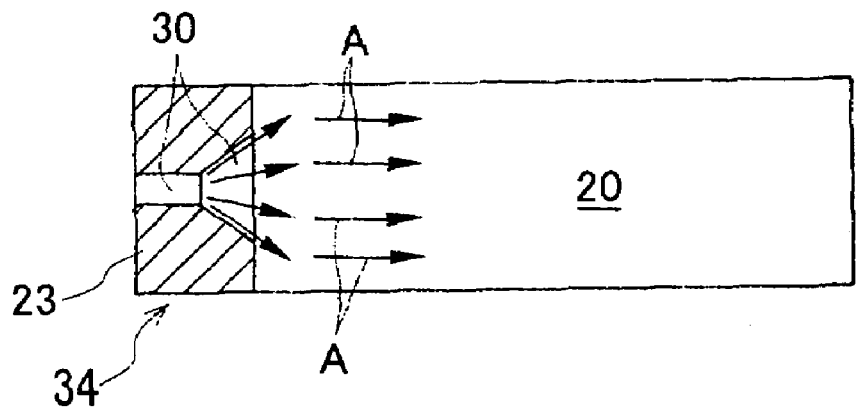

FIG. 2 is a view which schematically illustrates such mixing reaction. The orthogonal flow B jetted out from the direction which is substantially orthogonal to the straightly-going flow A is caused to be involved in following wake flow followed (entrained) in the turbulent straightly-going flow A having a high velocity, thereby a large eddy viscosity generated by the mixing of the turbulent straightly-going flow A and the orthogonal flow B is utilized, to give a high mixing efficiency. In FIG. 2, the hatched region of symbol C schematically represents the eddy viscosity, and symbol P represents a substantial central portion of the eddy viscosity C.

The mixing chamber 20, the first and second nozzles 34 and 36, and the discharge pipe 26 in the static mixing apparatus 12 are formed to have the following relationship: It is necessary that the eddy viscosity is generated in the mixing chamber 20; the velocity of straightly-going flow A is reduced in order to generate the eddy viscosity; the diameter $D_1$ of the mixing chamber 20 is therefore made larger than the diameter $D_2$ of the first nozzle 34; and the eddy viscosity generated by the straightly-going flow A is important to make the mixing efficiency good, and the dimensional ratio of the diameter $D_1$ of the mixing chamber 20 to the diameter $D_2$ of the first nozzle 34 is preferably within the range from 1.1 to 1000, more preferably within the range from 1.1 to 100.

In order to cause the orthogonal flow B to be easily involved in the straightly-going flow A, the flow velocity of the jetted-out orthogonal flow B is preferably equivalent to or less than the flow velocity of the jetted-out straightly-going flow A. Specifically, the flow velocity ratio of the flow velocity of the jetted-out orthogonal flow B to the flow velocity of the jetted-out straightly-going flow A is preferably from 0.01 to 0.4, more preferably from 0.01 to 0.1. The flow velocity of the jetted-out straightly-going flow A is equal to the velocity of the solution jetted out from the first nozzle 34.

The position of the introducing nozzle (the second nozzle), which is a jetting-out port for the orthogonal flow B, is very important. It is necessary to jet the orthogonal flow B into the mixing chamber 20 at a position before the position where the eddy viscosity C generated by jetting the straightly-going flow A from the small-diameter first nozzle 34 to the larger-diameter mixing chamber 20 would be maximum. It is necessary to arrange the second nozzle 36 between the first nozzle 34 and the position of the maximum of the eddy viscosity C. It is therefore necessary to know the position where the eddy viscosity C is maximum. The position, in the mixing chamber 20, where the eddy viscosity C is maximum, can be grasped by performing simulation beforehand using a numerical analysis software R-Flow, manufactured by R-Flow Co., which is well known as a fluid analysis software commercially available in Japan. In this case, the position where the eddy viscosity C is maximum is not a point but has a region as can be understood from FIG. 2. Therefore, the position of the maximum of the eddy viscosity C may be regarded as the point P, which is the substantially central portion of the eddy viscosity C. Thus, the second nozzle 36 should be positioned before the point P. Preferably, the second nozzle 36 is positioned so that the orthogonal B can be jetted out at the initial stage of the generation of the eddy viscosity C. A plurality of the discharge nozzles for the orthogonal flow B may be used.

In this connection, when the mixing apparatus has no mixing chamber 20 for generating the eddy viscosity C or the first and second nozzles 34 and 36 have an inappropriate positional relationship, the straightly-going flow A, followed by the orthogonal flow B added in the midway, is taken out from the mixing site before the flow A is mixed with the flow B, or alternatively the mixing site needs to be very long, in order to make the mixing of the flows complete. This causes time interval between the initial and the final of the mixing becomes long, and the particle size distribution of the resultant metal fine-particles or metal hydroxide fine-particles becomes wide.

From results of analysis by the above-mentioned numerical analysis software, the region (P) where the eddy viscosity C makes its appearance has a relationship with the flow velocity of the straightly-going flow A, and substantially corresponds to a position where the maximum velocity of the straightly-going flow A, (which is generally the flow velocity at the first nozzle outlet (position)), is reduced to $1/10$ thereof. Accordingly, if the position where the maximum velocity of the straightly-going flow A is reduced to $1/10$ thereof is calculated and the second nozzle 36 is positioned in such a manner that the orthogonal flow B can be jetted before the point, it is unnecessary to calculate the point P. This is because: a high eddy viscosity is generated when the velocity of high velocity fluid is reduced; therefore it is necessary to perform the mixing before the reduction of the velocity is finished.

That is, the second nozzle 36, which is a jetting-out port of the orthogonal flow B, is set to a position in the region where the velocity Vz of the straightly-going flow A is represented by the following formula (1), in the direction along which the maximum velocity of the straightly-going flow A is exhibited when the flow A is jetted to the mixing chamber (i.e., in the Z direction):

$$(1/10)Vz0 < Vz < Vz0 \qquad \text{Formula (1)}$$

wherein Vz0 represents the velocity of the straightly-going flow at the outlet of the nozzle in the direction along which the maximum velocity of the straightly-going flow is exhibited when the straightly-going flow is jetted into the mixing camber.

It is also necessary to keep the length L (see FIG. 1) of the mixing chamber 20 necessary for making the eddy viscosity C generated in the mixing chamber 20 maximum. If the length of the mixing chamber 20 is too long, the mixed reaction solution 40 remains or flows backward easily in the mixing chamber 20 so that bad effect is caused on (nano-) miniaturization of the particle size of the metal particles or the metal hydroxide fine-particles or the mono-dispersibility thereof. Thus, the length L of the mixing chamber 20 is preferably from 2 to 5 times (more preferably from 2 to 3 times) the distance from the first nozzle 34 to the point P, where the eddy viscosity C is maximum.

When liquid at a high flow velocity is jetted out from the small-diameter first nozzle 34 or second nozzle 36 to the larger-diameter mixing chamber 20, cavitation is easily caused. By the cavitation, a gas-liquid interface is formed in the mixing chamber 20 so that the mixing efficiency is lowered. Thus, in order to use the eddy viscosity C to raise the mixing efficiency, it is necessary not to form any gas-liquid interface in the mixing chamber 20. As illustrated in FIG. 1, therefore, it is preferable to use a third orifice 38 to narrow the diameter $D_4$ of the discharge pipe 26, thereby making the diameter $D_4$ smaller than the cylinder diameter $D_1$ of the mixing chamber 20; and mix the two solutions in the state that pressure in the mixing chamber 20 is raised. In this way, the problem of cavitation can be solved, and the mixing efficiency can be further improved. In order to shorten the period of time when the mixed reaction solution remains in portions which do not contribute to mixing inside the discharge pipe 26 as short as possible, it is advisable to narrow the outlet of the mixing chamber 20 and further shorten the discharge pipe 26 having at least a smaller inner diameter than the cylinder diameter $D_1$ of the mixing chamber 20 as much as possible and connect the discharge pipe 26 to a tank for crystal-growth. (not illustrated).

The dimensional ratio of the diameter $D_1$ of the mixing chamber 20 to the diameter $D_4$ of the discharge pipe 26 is preferably within the range of from 1.4 to 10, more preferably within the range of from 2 to 5.

The shapes of the jetted flows jetted out from the first and second nozzles 34 and 36 to the mixing chamber 20 are regulated by the first and second orifices 30 and 32 fitted to the first and second nozzles 34 and 36, respectively. These jetted flow shapes have influence on the performance of mixing. It is therefore preferred to use appropriately the first orifice 30 for generating a jetted flow shape, such as a tread line, conical, slit or fan shape, dependently on the purpose of the mixing reaction. For example, in the case of reaction having a very large reaction rate in millisecond order, it is necessary to jet the straightly-going flow A and the orthogonal flow B so as to make the eddy viscosity C maximum instantaneously in a region which is as small as possible. Thus, the first orifice 30 is preferably an orifice for generating a jetted flow in a thread line form. In the case of reaction having a relatively small reaction rate, it is preferred to jet the straightly-going flow A and the orthogonal flow B so as to make the eddy viscosity C maximum in a region which is as wide as possible, thereby increasing the entraining region area generated by the straightly-going flow A. In this case, the first orifice 30 is preferably an orifice for generating a jetted flow in a thin film form. In the case of reaction having a middle reaction rate, between the very large reaction rate that is in order of milliseconds and the relatively small reaction rate, the first orifice 30 is preferably an orifice for generating a jetted flow in a conical form.

FIGS. 3(a) to 6(c) illustrate orifices for generating jetted flows in thread line, conical, slit and fan forms. FIGS. 3(a), 4(a), 5(a) and 6(a) each illustrate a view seen from the tip side of each of the orifices, FIGS. 3(b), 4(b), 5(b) and 6(b) each illustrate a vertical sectional view thereof, and FIGS. 3(c), 4(c), 5(c) and 6(c) each illustrate a transverse sectional view thereof.

FIGS. 3(a), 3(b) and 3(c) illustrate the first orifice 30 for jetting the straightly-going flow A in a thread line form into the mixing chamber 20, the orifice being made into a straight thread line form. FIGS. 4(a), 4(b) and 4(c) illustrate the first orifice 30 for jetting the straightly-going flow A in a conical form into the mixing chamber 20, the orifice being made into a trumpet form, in which the tip thereof is spread. FIGS. 5(a), 5(b) and 5(c) illustrate the first orifice 30 for jetting the straightly-going flow A in a thin film form into the mixing chamber 20, the orifice being made into a rectangular slit form. FIGS. 6(a), 6(b) and 6(c) illustrate the first orifice 30 for jetting the straightly-going flow A in a thin film and fan form into the mixing chamber 20, the orifice being made in such a manner that the tip thereof is spread in a fan form.

It is stated in "Chemical Engineering Outline" (written by Haruo Hikita, and edited by Asakura Shoten Co., Ltd.) that Reynolds' numbers of fluid in pipes having a noncircular section, for example, the slit-form first orifice 30 illustrated in FIGS. 5(a), 5(b) and 5(c), can be handled as follows: when S represents the sectional area of the fluid, and lp represents the length of the periphery of the solid wall contacting the fluid, the corresponding diameter De is defined by: De=4S/lp. Since the slit-form orifice has a closed-groove structure, lp is represented by: lp=2(a+b) wherein a represents the length of the short side and b represents the length of the long side. Therefore, the corresponding diameter De is represented by the following formula (2).

$$De=4(ab)/2(a+b)=2ab/(a+b) \quad \text{Formula (2)}$$

When turbulence represented in the present invention is calculated, the above De calculated from the formula (2) can be used as the equivalent circle diameter.

The following will describe a method of using the static mixing apparatus 12 having the above-mentioned structure to form metal particles or metal hydroxide fine-particles.

First, the solution Y is jetted out, in the form of the turbulent straightly-going flow A, from the first nozzle 34 to the mixing chamber 20. The solution X is jetted, in the form of the orthogonal flow B, from the second nozzle 36, which is substantially orthogonal to the straightly-going flow A, to a position before the position where the eddy viscosity C, which is generated by jetting out the straightly-going flow A from the small-diameter first nozzle 34 to the larger-diameter mixing chamber 20, would be maximum, or to a position before the position where the maximum velocity of the straightly-going flow A would be reduced to 1/10 or less thereof. In this way, the orthogonal flow B is carried by the straightly-going flow A, thereby mixing the two solutions to react each other in an instant. Then, the resultant mixed reaction solution 40 is discharged from the discharge pipe 26.

In the mixing reaction using the eddy viscosity C, there are two methods for improving the mixing reactivity in the chamber 20.

The first method thereof is a method of jetting out the straightly-going flow A in the form of a thread line at a high velocity, to make the eddy viscosity C maximum instantaneously in a region which is as small as possible. It is preferred for this method to use the first orifice 30 for generating thread line form jetted flow, as illustrated in FIGS. 3(a), 3(b) and 3(c), as the first orifice 30 of the first nozzle 34 for jetting out the straightly-going flow A.

From the viewpoint of the mixing, it is more preferred that the straightly-going flow A is high-velocity flow. However, in order to control the reaction product in this case to desired particle sizes and a desired size distribution, it is essential to consider influence on the reaction of frictional heat resulting from liquid-liquid friction generated by the high velocity flow. It is effective as measures against this friction heat to lower the temperature of the reaction solution beforehand and use this reaction solution; cool the reaction solution by means of the adding-pipes, orifice sections, mixing chamber section and discharging section which are made to have a double wall structure, and use them; or perform both of these two measures. The velocity of the high velocity flow is determined by the jetted-out pressure applied dependently on the jetted-out flow rate and by the inner diameter of the first orifice 30; therefore, in order to produce higher velocity flow, it is necessary to make the inner diameter of the first orifice 30 as small as possible and raise the pressure applied to the liquid. Accordingly, the abrasion of the first orifice 30 becomes a more serious problem as the velocity of high velocity flow becomes larger. However, this problem can be overcome by the use of highly durable material such as diamond.

The second method is a method of making the straightly-going flow A to thin film form jetted flow, thereby increasing the entraining region formed by the straightly-going flow A. It is preferred for this method to use the first orifice 30 for generating slit or fan form jetted flow, as illustrated in FIGS. 5(a), 5(b) and 5(c), and FIGS. 6(a), 6(b) and 6(c), as the first orifice 30 of the first nozzle 34 for jetting out the straightly-going flow A. In this case, it is necessary to adjust the flow velocity of the jetted-out orthogonal flow B in such a manner that the orthogonal flow B does not break the thin film of the straightly-going flow A. It is more preferred to make the second orifice 32 of the second nozzle 36 into a form as illustrated in FIGS. 5(a), 5(b) and 5(c) or FIGS. 6(a), 6(b) and 6(c) and make the orthogonal flow B to slit or fan form and thin film-like jetted flow in the same manner as the straightly-going flow A.

Since the second method makes it possible to ensure a larger eddy viscosity region, a good mixing performance can be obtained even if the flow velocity of the jetted-out straightly-going flow A is made smaller than that in the case of the thread line form jetted flow. Consequently, the abrasion resistance of the first and second orifices 30 and 32 is improved, to make it possible that the orifices can be made of a metal, a treated metal product, a ceramic or some other material, each of which has good workability. Moreover, by making the flow velocity of the straightly-going flow small, the generation of frictional heat can be suppressed. Therefore, metal particles or metal hydroxide fine-particles having finer particle sizes can be formed.

As described above, the static mixing apparatus 12 that can be used in the present invention has been made on the basis of an unprecedented idea; and by using the static mixing apparatus 12, the following advantageous effects can be exhibited.

(1) The static mixing apparatus is made to have a structure for generating eddy viscosity, thereby an excellent mixing reaction state for static mixing can be obtained; therefore, metal particles or metal hydroxide fine-particles having fine particle sizes and excellent mono-dispersibility can be formed.

(2) Eddy viscosity is used to cause the solution Y and the solution X to be mixed and react with each other, thereby a good mixing performance can be obtained even if the flow velocity of the jetted-out solution Y or X is made small. Thus, the pressure of the jetted-out flow can be lowered. In this way, the easiness of the production of the apparatus, and the safety and maintainability of the apparatus can be improved. In particular, the material of the first and second orifices 30 and 32 can be changed to an inexpensive and workable material other than diamond.

(3) At least the straightly-going flow is jetted out in a thin film form, thereby the solution Y and the solution X can be caused to be mixed and react with each other at high concentrations. In this way, seed particles of metal particles or metal hydroxide fine-particles can be formed or caused to grow at such a high concentration level that industrial profit can be produced.

About the fine particle of the present invention, preferably of the second embodiment of the present invention, the equivalent sphere diameter Ds thereof, which is a value obtained by converting the size of the particle to the diameter of the sphere having the same volume, is preferably from 1 nm to 100 μm, particularly preferably from 1 nm to 1 μm.

In the present invention, examples of the metal which makes the metal particles or the metal hydroxide fine-particles include Ib group elements (Cu, Ag and Au), IIa group elements (such as Mg, Ca and Sr), IIb group elements (Zn, Cd and Hg), IIIa metal elements (such Sc, Y, and Eu), IIIb group elements except boron (Al, Ga, In and Tl), IVa group elements (such as Ti and Zr), IVb group elements except carbon and silicon (Ge, Sn and Pb), Va group elements (such as V, Nb and Ta), Vb group elements except nitrogen and phosphorus (As, Sb and Bi), VIa group elements (such as Cr, Mo and W), VIIa group elements (such as Mn, Tc and Re), and VIII group elements (such as Fe, Ru, Co, Ni and Pd).

The kind of the reducing agent for use in the first embodiment of the present invention is not particularly limited. Examples thereof include inorganic reducing agents such as alkali metals, alkali earth metals, metal salts having a baser redox potential, $NaBH_4$, hydrazine salts and hydrogen gas; and organic reducing agents such as amine-based compounds and diol-based compounds.

In the first embodiment of the present invention, a salt of the above-mentioned metal and the above-mentioned reducing agent are dissolved in water or a suitable organic solvent such as alcohol, so as to be used as a metal salt solution and a reducing agent solution, respectively. The metal salt solution or the reducing agent solution may be a solution wherein a single metal salt or reducing agent is contained, or a solution where a mixture of plural metal salts or reducing agents is contained.

Concentrations of the metal salt solution and the reducing agent solution used in the first embodiment of the present invention can be set arbitrarily. From the viewpoint of the size control and productivity, the concentrations are preferably 0.05 mol/L or more and 5 mol/L or less, more preferably 0.1 mol/L or more and 1 mol/L or less. The temperature of the solutions is preferably 5° C. or more and 75° C. or less.

The flow rate of each of the metal salt solution and the reducing agent solution in the contact interface in the first embodiment of the present invention is preferably from 0.05 to 1000 mL/minute, more preferably from 0.1 to 100 mL/minute. The flow rate of the metal salt solution may be the same as or different from that of the reducing agent solution.

The solution which contains metal ions used in the second embodiment of the present invention may be a metal salt solution in which a salt of metal as described above is dissolved in water or an organic solvent such as alcohol. The metal salt solution may be used alone, or it may contain plural metal salts as a mixture.

In the second embodiment of the present invention, a metal oxide can be obtained by: mixing the hydroxide ion-containing solution with the metal ion-containing solution, as described above, to form metal hydroxide fine-particles; and firing the particles in a conventional manner, to oxidize the metal hydroxide fine-particles.

The kind of the solution which contains hydroxide ions used in the second embodiment of the present invention is not particularly limited. Examples thereof include aqueous solutions of alkali metal salts (such as lithium hydroxide, sodium hydroxide, potassium hydroxide, sodium carbonate, sodium hydrogencarbonate, potassium carbonate, and sodium borate), alkali earth metal salts (such as magnesium hydroxide, calcium hydroxide, strontium hydroxide, and barium hydroxide), ammonia, hydrazine, and organic salts (such as tetramethylammonium hydroxide, tetraethylammonium hydroxide, guanidines, and amidines).

The metal ion concentration in the solution which contains metal ions or the hydroxide ion concentration in the solution which contains hydroxide ions can be set arbitrarily. From the viewpoint of the size control and productivity, the concentrations are preferably 0.05 mol/L or more and 5 mol/L or less, more preferably 0.1 mol/L or more and 1 mol/L or less. The temperature of the solutions is preferably 5° C. or more and 75° C. or less.

The flow rate of each of the solution which contains metal ions and the solution which contains hydroxide ions in the contact interface in the second embodiment of the present invention is preferably from 0.05 to 1000 mL/minute, more preferably from 0.1 to 100 mL/minute. The flow rate of the solution which contains metal ions may be the same as or different from that of the solution which contains hydroxide ions.

It is preferable to incorporate an adsorptive compound (dispersing agent), which is adsorbed on the surfaces of the metal particles, into at least one of the metal salt solution and the reducing agent solution used in the first embodiment of the present invention. Also, it is preferable to incorporate an adsorptive compound, which is adsorbed on the surfaces of the metal hydroxide fine-particles, into at least one of the solution which contains metal ions and the solution which contains hydroxide ions used in the second embodiment of the present invention. The (fine) particles can be dispersed in a solvent in the state that the particle surfaces are modified with the adsorptive compound, thereby a stable particle-containing dispersion or fine particle-containing dispersion (colloid dispersion) can be obtained. In this case, the amount of the adsorptive compound to be used is not particularly limited, and the amount may be a level that can make dispersibility of the particles sufficiently high.

Effective examples of the adsorptive compound include compounds containing any of —SH, —CN, —NH$_2$, —SO$_2$OH, —SOOH, —OPO(OH)$_2$, and —COOH. Among these examples, preferred are compounds containing any of —SH, —NH$_2$ and —COOH. In the case that the colloid is hydrophilic colloid, it is preferred to use an adsorptive compound having a hydrophilic group (such as —SO$_3$M and —COOM in which M represents a hydrogen atom, an alkali metal atom, an ammonium molecule or the like). There may be used an anionic surfactant (such as Aerosol OT and sodium dodecylbenzenesulfonate), or a hydrophilic macromolecular compound (such as hydroxyethylcellulose, polyvinyl pyrrolidone, polyvinyl alcohol, polyethylene glycol, and gelatin).

The fact that the particle surfaces or the fine-particle surfaces are modified with the adsorptive compound or the hydrophilic macromolecular compound can be identified by chemical analysis and the fact that a high resolution transmission electron microscope (TEM), such as an electric field emission-type transmission electron microscope (FE-TEM), demonstrates that the particles have a given interval therebetween.

In the present invention, examples of the dispersing medium in the particle- or fine-particle-containing dispersion include water; esters such as butyl acetate and cellosolve acetate; ketones such as methyl ethyl ketone, cyclohexanone, and methyl isobutyl ketone; chlorinated hydrocarbons such as dichloromethane, 1,2-dichloroethane and chloroform; amides such as dimethylformamide; hydrocarbons such as cyclohexane, heptane, octane and isooctane; ethers such as tetrahydrofuran, ethyl ether, and dioxane; alcohols such as ethanol, n-propanol, isopropanol, n-butanol, and diacetone alcohol; fluorine-containing compound solvents such as 2,2,3,3-tetrafluoropropanol; and glycol ethers such as ethylene glycol monomethyl ether, ethylene glycol monoethyl ether, and propylene glycol monomethyl ether. These solvents may be used alone or in combination of two or more thereof, considering the dispersibility of the compound to be used.

In the first embodiment, the dispersing medium of the colloid dispersion may be the same as or different from a solvent in the metal salt solution or the reducing agent solution. In the second embodiment, the dispersing medium of the colloid dispersion may be the same as or different from a solvent in the solution which contains metal ions. When the dispersing medium is different from the solvent, it is possible to conduct solvent exchange when desalted.

The metal particles or metal hydroxide fine-particles synthesized in the above-mentioned static mixer can be introduced into another reaction vessel, and subjected to crystal-growth, thereby particles having larger sizes can be obtained. The kind of this method of producing the larger-size particles by crystal growth is not particularly limited, and the method may be a usual method. The reaction vessel in the case may be the same static mixer as described above, or a mixer based on stirring mixing, as described in JP-A-7-219092, JP-A-8-171156, JP-A-4-283741, JP-B-8-22739, U.S. Pat. No. 3,782,954 etc. Furthermore, in the first embodiment of the present invention, the metal salt solution and/or the reducing agent solution may be further added to this reaction vessel. In the second embodiment of the present invention, the solution which contains metal ions and/or the solution which contains hydroxide ions may be further added to this reaction vessel.

Moreover, in the first embodiment of the present invention, the metal particles synthesized in the static mixer may be introduced into another reaction vessel and then a different metal salt solution and a reducing agent solution are added thereto to cause reaction, thereby making it possible to obtain composite metal particles wherein cores are made of the metal particles and shells are made of the different metal. In this case, each of the core and the shell may be made of one metal or composite metals. The core/shell particles may be those wherein the metal particles make a core and a metal compound (whose metal may be the same as or different from the metal in the core) makes a shell. The reaction vessel in these cases may be the same static mixer as described above, or a stirring mixer as described above. The method of producing the core/shell type particles is not particularly limited, and may be a usual method.

Also, in the second embodiment of the present invention, the metal hydroxide fine-particles synthesized in the static mixer may be introduced into another reaction vessel, and then a solution which contains different metal ions and a solution which contains hydroxide ions are incorporated into the vessel so as to cause reaction, thereby core/shell type fine particles can be obtained, in which the metal hydroxide fine-particles make a core and the different metal makes a shell. In this case, each of the core and the shell may be made of one metal or composite metals. The core/shell fine-particles may be those wherein the metal hydroxide fine-particles make a core and a metal compound (whose metal may be the same as or different from the metal in the core) makes a shell. The reaction vessel in these cases may be the same static mixer as described above or a stirring mixer as described above. The method of producing the core/shell-type fine-particles is not particularly limited, and may be a usual method.

The concentration of the particles in the particle dispersion or the fine-particles in the fine-particle dispersion, produced according to the method of the present invention, is not particularly limited. The resultant dispersion can be concentrated by a usual concentrating method. The concentration is preferably 0.01% by mass or more, more preferably from 0.1 to 20% by mass, when the particles are initially produced. The concentration is preferably 0.1% by mass or more after the (fine) particles are subjected to growth treatment. In the case that the particles are used in a coating solution for applying an electrically conductive material or recording material, the concentration of the (fine) particles, which varies dependently on the purpose thereof, is preferably 0.1% or more by mass, more preferably 1% or more by mass. However, the concentration is not limited to such a range(s).

The metal particle-containing dispersion or the metal hydroxide fine-particle-containing dispersion of the present invention can be produced preferably by a method wherein a multistage ultrafiltration apparatus is provided, as well as a mixer (for example, the above-mentioned static mixer) and/or a reaction vessel, and a salt(s) or the like dissolved in the (fine) particle-containing dispersion in the mixer and/or the reaction vessel is continuously removed.

The multistage ultrafiltration apparatus is an apparatus in which plural ultrafiltration membranes in a thin tubular form are combined in series and/or in parallel, an example of which is a Viva Flow 50 (trade name) made by Sartorius AG. While a dispersing medium is added to this apparatus, the colloidal dispersion which contains the metal particles or the metal hydroxide fine-particles are caused to pass through the membranes, thereby the dispersion can be effectively desalted and concentrated. The flow rate of the colloid dispersion caused to pass through the ultrafiltration membranes, which can be appropriately set dependently on the concentration of the colloid dispersion, the kind of the used dispersing agent, and other factors, is preferably from 10 to 1000 mL, more preferably from 100 to 500 mL, per pass of ultrafiltration membrane. The conductivity of the colloid dispersion after being subjected to the ultrafiltration is preferably 1 mS/cm or less.

According to the present invention, it is possible to provide a method of continuously producing monodispersive metal particles having even particle sizes.

According to the production method of the present invention, it is possible to synthesize continuously monodispersive metal fine-particles (nanoparticles), which have even particle sizes and have an average particle size of 1 μm or less. Moreover, by subjecting the above particles to crystal-growth, monodispersive particles having larger particle sizes and core/shell-type particles can be formed.

Metal particles are used as electrically conductive materials or recording materials; it is known that the use of monodispersive particles causes the S/N ratio to be improved or the higher density. According to the method of the present invention, metal particles satisfying this requirement can be produced.

Further, according to the present invention, it is possible to provide a method of continuously producing monodispersive metal hydroxide fine-particles having even particle sizes.

Further, according to the present invention, by subjecting the above fine particles to crystal-growth, it is possible to provide a method of forming monodispersive particles having a larger size, or a method of forming core-shell-type fine-particles.

Further, according to the present invention, it is possible to provide a method of continuously removing a dissolved product(s), such as a salt or a decomposition product, generated together with the metal hydroxide.

According to the method of the present invention, it is possible to obtain a fine-particle colloid having a narrow particle size distribution and excellent mono-dispersibility. By combining the present invention with a multistage ultrafiltration apparatus, it is possible to desalt a fine-particle-containing dispersion or remove a decomposition product in a simple manner. To produce an oxide conductive product (for example, a transparent electrode) made of a semiconductor, it has been attempted to use fine particles of a metal hydroxide in a coating method. In this connection, it is known that when the fine particles having even particle sizes are used, the electric conductivity thereof is improved. The fine particles obtained by the method of the present invention have high mono-dispersibility, and the particles are suitable for the above-mentioned requirement.

The present invention will be described in more detail based on the following examples, but the present invention is not limited thereto.

EXAMPLES

Example 1

(Preparation of Silver Fine-particles)

Into 5000 mL of water was dissolved 85 g of silver nitrate, to prepare an aqueous silver nitrate solution. Separately, into 5000 mL of water were dissolved 210 g of ferrous sulfate heptahydrate and 420 g of citric acid monohydrate, to prepare an aqueous ferrous sulfate solution, as a reducing agent solution.

The reducing agent solution (solution Y) and the silver nitrate solution (solution X) were introduced into the static mixing apparatus as illustrated in FIG. 1, to prepare silver fine-particles. That is, the solution Y was jetted out, as straightly-going flow A, from the first nozzle 34 into the mixing chamber 20 at room temperature (25° C.). The flow velocity of the solution Y when being jetted into the mixing chamber 20 was set to 360 m/sec. The diameter $D_2$ of the first nozzle 34 was 0.13 mm. The solution X, which was kept at room temperature (25° C.), was jetted out, as orthogonal flow B, from the second nozzle 36. The diameter $D_3$ of the second nozzle 36 was 1.3 mm. The velocity of the jetted-out solution X was 3.6 m/sec. The velocity-reducing region was the mixing chamber 20 having a cylindrical shape and a diameter of 4.0 mm ($D_1$). The discharging port had a diameter $D_4$ of 2.0 mm. The position (center) of the second nozzle 36 was positioned 2 mm apart from the tip of the first nozzle 34 in the Z direction. The length L of the mixing chamber was 12 mm.

When the straightly-going flow jetted out from the first nozzle 34 advanced up to (reached) the position of the second nozzle 36, the velocity thereof in the direction of the maximum velocity of the straightly-going flow when being jetted out (i.e., the Z direction velocity component) was calculated, using numerical fluid analysis (in which an analysis cord R-Flow, manufactured by R-flow Co., was used) using finite difference method. As a result, the velocity was about 300 m/sec. The position where the eddy viscosity generated by the solution Y would be maximum was calculated as a position about 5 to about 10 mm apart from the tip of the first nozzle in the Z direction.

The resultant reaction mixed solution was desalted and concentrated by multistage ultrafiltration, so as to yield a fine-particle colloid dispersion. In the ultrafiltration, Viva Flow 50 (trade name) made by Sartorius AG was used.

The silver fine-particles in the resultant fine-particle colloid dispersion were observed on a microscopic photograph thereof taken with a transmission electron microscope capable of being cooled. As a result, the particles had an average particle size of 5 nm and a variation coefficient (of the particle size distribution) of 11%.

Comparative Example 1

(Preparation of Silver Fine-particles)

Figure 7:
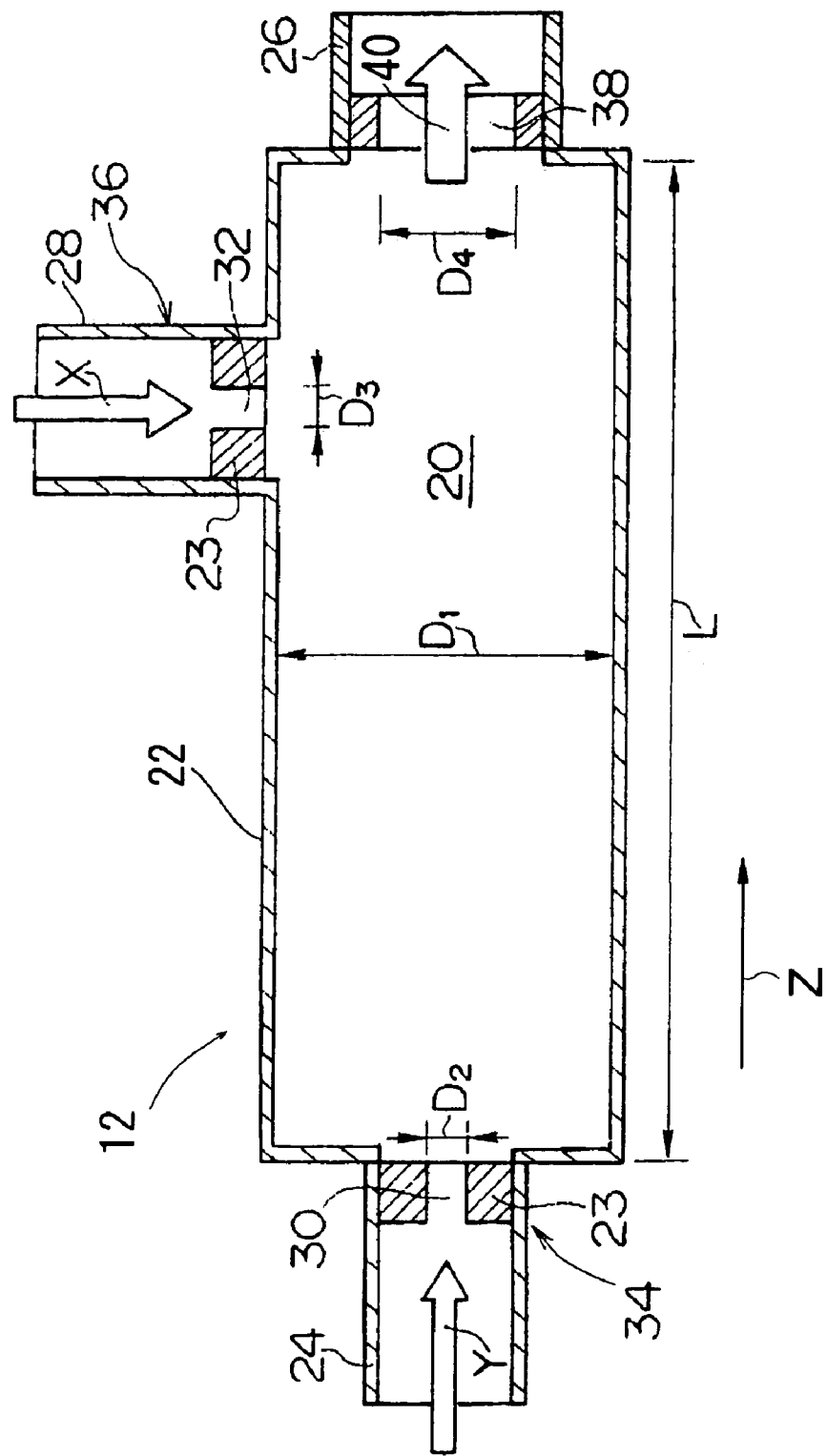
FIG. 7 is a schematic diagram of a static mixing apparatus used in the method of producing metal particles or metal hydroxide fine-particles according to comparative examples.

Silver fine-particles were prepared in the same manner as in Example 1, except that a static mixing apparatus, as illustrated in FIG. 7, was used. The static mixing apparatus illustrated in FIG. 7 had the same structure as the apparatus illustrated in FIG. 1, except that the mixing chamber was extended so that the center of the second nozzle 36 for jetting out the solution X was located at a position 15 mm apart from the tip of the first nozzle 34 in the Z direction. The reference numbers in FIG. 7 have the same meanings as in FIG. 1.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was about 5 m/sec, from the results in numerical fluid analysis. The position where the eddy viscosity generated by the solution Y would be maximum was calculated as a position 5 to 10 mm apart from the tip of the first nozzle in the Z direction.

The obtained silver fine-particles were observed on a microscopic photograph thereof taken with the transmission electron microscope capable of being cooled. As a result, the particles had an average particle size of 5 nm and a variation coefficient of 15%.

Example 2

(Preparation of Silver Fine-particles)

Silver fine-particles were prepared in the same manner as in Example 1, except that the velocity of the solution Y jetted out from the first nozzle 34 was set to 36 m/sec and that the velocity of the solution x jetted out from the second nozzle 36 was set to 0.36 m/sec.

When the jetted flow (straightly-going flow) jetted out from the first nozzle 34 advanced up to the position of the second nozzle 36, the velocity thereof in the direction of the maximum velocity of the straightly-going flow when being jetted out (i.e., the Z direction velocity component) was calculated in numerical fluid analysis. As a result, the velocity was about 33 m/sec. The position where the eddy viscosity generated by the solution Y would be maximum was calculated as a position 7 to 9 mm apart from the tip of the first nozzle in the Z direction.

In the same manner as in Example 1, the resultant silver fine-particles were observed on a microscopic photograph thereof taken with the transmission electron microscope capable of being cooled. As a result, the particles had an average particle size of 7 nm and a variation coefficient of 13%.

Comparative Example 2

(Preparation of Silver Fine-particles)

Silver fine-particles were prepared in the same manner as in Example 2, except that the static mixing apparatus illustrated in FIG. 7 was used.

When the jetted flow (straightly-going flow) jetted out from the first nozzle 34 advanced up to the position of the second nozzle 36, the velocity thereof in the direction of the maximum velocity of the straightly-going flow when being jetted out (i.e., the Z direction velocity component) was about 0.1 m/sec, from the results in numerical fluid analysis. The position where the eddy viscosity generated by the solution Y would be maximum was calculated as a position 7 to 9 mm apart from the tip of the first nozzle in the Z direction.

The obtained silver fine-particles were observed in the same manner as in Example 2. As a result, the particles had an average particle size of 8 nm and a variation coefficient of 28%.

From the comparison of the results of Examples 1 and 2 to Comparative Examples 1 and 2, it can be understood that the variation coefficients in the examples according to the present invention were made remarkably better than those of the comparative examples by 27% and 54%, respectively, and that the silver fine-particles produced by the production method according to the present invention were monodispersive. It can also be understood that the advantageous effects exhibited by the present invention are also effective even in the case that the velocity of the straightly-going flow was low.

Example 3

(Preparation of Platinum Fine-particles)

Into 5000 mL of a water/ethanol mixed solvent (volume ratio: 1/1) were dissolved 1.2 g of chloroplatinic acid hexahydrate and 100 g of polyvinyl pyrrolidone (average molecular weight: 10,000), to prepare a chloropalatinic acid solution. Separately, into 5000 mL of a water/ethanol mixed solvent (volume ratio: 1/1) was dissolved 110 g of N-methyl-p-aminophenol sulfate, to prepare a reducing agent solution. Oxygen was removed from the entire volumes of both of the two solutions, and then the resultant two solutions were kept at 50° C.

The reducing agent solution (solution Y) and the chloroplatinic acid solution (solution X) were introduced into the static mixing apparatus as illustrated in FIG. 1, to prepare platinum fine-particles. The solution Y was jetted out, as straightly-going flow A, from the first nozzle 34 into the mixing chamber 20 at 50° C. The flow velocity of the solution Y when being jetted into the mixing chamber 20 was set to 360 m/sec. The solution X, which was kept at 50° C., was jetted out, as orthogonal flow B, from the second nozzle 36. The velocity of the jetted-out solution X was 3.6 m/sec.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was about 300 m/sec, from the results in numerical fluid analysis. The position where the eddy viscosity generated by the solution Y would be maximum was calculated as a position about 5 to about 10 mm apart from the tip of the first nozzle in the Z direction.

The resultant platinum fine-particles were observed with a transmission electron microscope. As a result, the particles had an average particle size of 5 nm and a variation coefficient of 14%.

Comparative Example 3

(Preparation of Platinum Fine-particles)

Platinum fine-particles were prepared in the same manner as in Example 3, except that the static mixing apparatus as illustrated in FIG. 7 was used.

When the jet flow (straightly-going flow) jetted out from the first nozzle 34 advanced up to the position of the second nozzle 36, the velocity thereof in the direction of the maximum velocity of the straightly-going flow when being jetted out (i.e., the Z direction velocity component) was about 5 m/sec, from the results in numerical fluid analysis. The position where the eddy viscosity generated by the solution Y would be maximum was calculated as a position about 5 to about 10 mm apart from the tip of the first nozzle in the Z direction.

The resultant platinum fine-particles were observed with a transmission electron microscope. As a result, the particles had an average particle size of 6 nm and a variation coefficient of 21%.

The platinum fine-particles produced by the production method according to the present invention were made remarkably better in the variation coefficient than that in the comparative example by 33%, and they were monodispersive.

It can be understood from the above-mentioned results that the production method according to the present invention is effective for obtaining monodispersive metal particles, in metal particle formation using a reduction reaction.

Example 4

(Preparation of Indium Hydroxide Fine-particles)

Into 5000 mL of water were dissolved 111 g of indium chloride and 100 g of polyvinyl pyrrolidone having an average molecular weight of 3000, to prepare an aqueous indium chloride solution. Separately, into 5000 mL of water was dissolved 65 g of lithium hydroxide monohydrate, to prepare an aqueous lithium hydroxide solution.

The thus-prepared two aqueous solutions were kept at 0° C., and the resultant two solutions were introduced into the static mixing apparatus as illustrated in FIG. 1, to prepare hydroxide fine-particles. That is, the aqueous indium chloride solution (solution Y) was jetted out, as straightly-going flow A, from the first nozzle 34 in FIG. 1 into the mixing chamber 20 at 0° C. The flow velocity of the solution Y when being jetted into the mixing chamber 20 was set to 360 m/sec. The diameter $D_2$ of the first nozzle 34 was 0.13 mm. The aqueous lithium hydroxide solution (solution X), which was kept at 0° C., was jetted out, as orthogonal flow B, from the second nozzle 36. The diameter $D_3$ of the second nozzle 36 was 1.3 mm. The velocity of the jetted-out solution X was 3.6 m/sec. The velocity-reducing region was the mixing chamber 20 having a cylindrical shape and a diameter of 4.0 mm ($D_1$). The discharging port had a diameter $D_4$ of 2.0 mm. The position (center) of the second nozzle 36 was positioned 2 mm apart from the tip of the first nozzle in the direction of the maximum velocity of the straightly-going flow when being jetted out (i.e., in the Z direction). The length L of the mixing chamber was 12 mm.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was calculated, using numerical fluid analysis (in which an analysis cord R-Flow, manufactured by R-flow Co., was used) using finite difference method. As a result, the velocity was about 300 m/sec. The position where the eddy viscosity generated by the solution Y would be maximum was calculated as a position about 5 to about 10 mm apart from the tip of the first nozzle in the Z direction.

The resultant indium hydroxide fine-particles were observed on a microscopic photograph thereof taken with a transmission electron microscope capable of being cooled. As a result, the particles had an average particle size of 4 nm and a variation coefficient of 12%.

Comparative Example 4

(Preparation of Indium Hydroxide Fine-particles)

Indium hydroxide fine-particles were prepared in the same manner as in Example 4, except that the static mixing apparatus, as illustrated in FIG. 7, was used. The static mixing apparatus illustrated in FIG. 7 had the same structure as the static mixing apparatus illustrated in FIG. 1, except that the mixing chamber was extended so that the center of the second nozzle 36 for jetting out the solution X was located at a position 15 mm apart from the tip of the first nozzle 34 in the Z direction. The reference numbers in FIG. 7 have the same meanings as in FIG. 1.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was about 5 m/sec, from the results in numerical fluid analysis. The position where the eddy viscosity generated by the solution Y would be maximum was calculated as a position about 5 to about 10 mm apart from the tip of the first nozzle in the Z direction.

The indium hydroxide fine-particles contained in the discharged mixed reaction solution were observed on a microscopic photograph thereof taken with the transmission electron microscope capable of being cooled. As a result, the particles had an average particle size of 5 nm and a variation coefficient of 18%.

Example 5

(Preparation of Indium Hydroxide Fine-particles)

Indium hydroxide fine-particles were prepared in the same manner as in Example 4, except that the velocity of the solution Y jetted out from the first nozzle 34 was set to 36 m/sec and that the velocity of the solution X jetted out from the second nozzle 36 was set to 0.36 m/sec.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was calculated in numerical fluid analysis. As a result, the velocity was about 33 m/sec. The position where the eddy viscosity generated by the solution Y would be maximum was calculated as a position 7 to 9 mm apart from the tip of the first nozzle in the Z direction.

In the same manner as in Example 4, the resultant indium hydroxide fine-particles were observed on a microscopic photograph thereof taken with the transmission electron microscope capable of being cooled. As a result, the particles had an average particle size of 5 nm and a variation coefficient of 15%.

Comparative Example 5

(Preparation of Indium Hydroxide Fine-particles)

Indium hydroxide fine-particles were prepared in the same manner as in Example 5, except that the static mixing apparatus illustrated in FIG. 7 was used.

When the straightly-going flow jetted out from the first nozzle 34 advanced up to the position of the second nozzle 36, the velocity thereof in the direction of the maximum velocity of the straightly-going flow when being jetted out (i.e., the Z direction velocity component) was about 0.1 m/sec, from the results in numerical fluid analysis. The position where the eddy viscosity generated by the solution Y would be maximum was calculated as a position 7 to 9 mm apart from the tip of the first nozzle in the Z direction.

The resultant indium hydroxide fine-particles were observed in the same manner as in Example 5. As a result, the particles had an average particle size of 7 nm and a variation coefficient of 25%.

From the comparison of the results of Examples 4 and 5 to Comparative Examples 4 and 5, it can be understood that the variation coefficients in the examples according to the present invention were made remarkably better than those of the comparative examples by 33% and 40%, respectively, and that the indium hydroxide fine-particles formed by the production method according to the present invention were monodispersive. It can also be understood that the advantageous effects exhibited by the present invention are also effective, in particular, even in the case that the velocity of the straightly-going flow was low.

Example 6

(Generation of Indium Oxide)

The mixed reaction solution, which contained indium hydroxide, obtained in Example 4, was desalted and concentrated by multistage ultrafiltration, to yield a fine-particle colloid dispersion containing 10% by mass of indium hydroxide fine-particles and having a conductivity of 28 µS/cm. In the ultrafiltration, Viva Flow 50 (Trade name) made by Sartorius AG was used. The fine-particle colloid dispersion was applied onto a glass substrate by spin coating, dried at 80° C. for 30 minutes, and then fired in an electric furnace at 450° C. for 20 minutes. The sample thus-obtained after the firing was measured by X-ray diffraction analysis. As a result, it was identified that indium oxide was generated.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of producing metal particles, comprising:
    jetting out a metal salt solution and a reducing agent solution from respective nozzles to a mixing chamber, to give a mixed reaction solution thereof; and
    discharging the mixed reaction solution from a discharging port having a diameter smaller than a diameter of the mixing chamber,
    wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

2. The method according to claim 1, wherein the straightly-going flow is in a thread line form.

3. The method according to claim 1, wherein a flow velocity of the orthogonal flow when being jetted out is equivalent to or less than a flow velocity of the straightly-going flow when being jetted out.

4. A method of producing metal particles, comprising:
    jetting out a metal salt solution and a reducing agent solution from respective nozzles to a mixing chamber, to give a mixed reaction solution thereof; and
    discharging the mixed reaction solution from a discharging port having a diameter smaller than a diameter of the mixing chamber,
    wherein one of the metal salt solution and the reducing agent solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity $Vz$ of the straightly-going flow is represented by the following formula (1), in a direction along which the maximum velocity of the straightly-going flow is exhibited when the straightly-going flow is jetted into the mixing chamber:

$$(1/10)Vz0 < Vz < Vz0 \qquad \text{Formula (1)}$$

wherein $Vz0$ represents a velocity of the straightly-going flow at an outlet of the nozzle in the direction along which the maximum velocity of the straightly-going flow is exhibited when the straightly-going flow is jetted into the mixing chamber.

5. The method according to claim 4, wherein the straightly-going flow is in a thread line form.

6. The method according to claim 4, wherein a flow velocity of the orthogonal flow when being jetted out is equivalent to or less than a flow velocity of the straightly-going flow when being jetted out.

7. A method of producing metal fine-particles, comprising:
    jetting out a metal ion-containing solution and a hydroxide ion-containing solution from respective nozzles to a mixing chamber, to give a mixed reaction solution thereof; and
    discharging the mixed reaction solution from a discharging port having a diameter smaller than a diameter of the mixing chamber,
    wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position before a position where eddy viscosity generated by jetting the straightly-going flow into the mixing chamber would be maximum.

8. The method according to claim 7, wherein the metal fine-particles are fine particles of metal hydroxide.

9. The method according to claim 7, wherein the straightly-going flow is in a thread line form.

10. The method according to claim 7, wherein a flow velocity of the orthogonal flow when being jetted out is equivalent to or less than a flow velocity of the straightly-going flow when being jetted out.

11. A method of producing metal fine-particles, comprising:
    jetting out a metal ion-containing solution and a hydroxide ion-containing solution from respective nozzles to a mixing chamber, to give a mixed reaction solution thereof; and
    discharging the mixed reaction solution from a discharging port having a diameter smaller than a diameter of the mixing chamber,
    wherein one of the metal ion-containing solution and the hydroxide ion-containing solution is made into straightly-going flow, the straightly-going flow is jetted from a nozzle having a diameter smaller than the diameter of the mixing chamber to the mixing chamber, and the other solution is jetted out, in the form of orthogonal flow which is substantially orthogonal to the straightly-going flow, to a position within a range where a velocity $Vz$ of the straightly-going flow is represented by the following formula (1), in a direction along which the maximum velocity of the straightly-going flow is exhibited when the straightly-going flow is jetted into the mixing chamber:

$$(1/10)Vz0 < Vz < Vz0 \qquad \text{formula (1)}$$

wherein $Vz0$ represents a velocity of the straightly-going flow at an outlet of the nozzle in the direction along which the maximum velocity of the straightly-going flow is exhibited when the straightly-going flow is jetted into the mixing chamber.

12. The method according to claim 11, wherein the metal fine-particles are fine particles of metal hydroxide.

13. The method according to claim 11, wherein the straightly-going flow is in a thread line form.

14. The method according to claim 11, wherein a flow velocity of the orthogonal flow when being jetted out is equivalent to or less than a flow velocity of the straightly-going flow when being jetted out.

* * * * *